United States Patent [19]

Blanchette

[11] Patent Number: 4,518,143

[45] Date of Patent: May 21, 1985

[54] MOLD FOR FORMING A CONTAINER HAVING A PIVOT MEANS

[75] Inventor: Henry J. Blanchette, Leominster, Mass.

[73] Assignee: Plastican, Inc., Leominster, Mass.

[21] Appl. No.: 596,243

[22] Filed: Apr. 3, 1984

Related U.S. Application Data

[62] Division of Ser. No. 350,145, Feb. 19, 1982, abandoned.

[51] Int. Cl.³ .................. B29C 1/00; B29F 1/00
[52] U.S. Cl. .......................... 249/142; 425/542; 425/577
[58] Field of Search ............ 249/117, 122, 142; 425/542, 577

[56] References Cited

U.S. PATENT DOCUMENTS

| | | | |
|---|---|---|---|
| 2,900,666 | 8/1959 | Marcus | 249/142 |
| 3,861,840 | 1/1975 | Heisler | 425/577 |
| 3,915,363 | 10/1975 | Frankenberg | 224/45 C |
| 4,172,577 | 10/1979 | von Holdt | 425/577 |
| 4,293,073 | 10/1981 | Yates | 206/519 |
| 4,479,630 | 10/1984 | Wernecke | 425/542 |

FOREIGN PATENT DOCUMENTS 296284 10/1965 Netherlands .................. 220/91

Primary Examiner—Willard E. Hoag
Attorney, Agent, or Firm—Schiller & Pandiscio

[57] ABSTRACT

An open-ended container with unitary external wire bail support posts and tooling for its manufacture in which each support post incorporates a pair of partially overlapping wall segments differently spaced from the sidewall of the container body, the more distant segment being further from the sidewall than the nearer by the thickness of the nearer. In a preferred embodiment, the more distant segment is provided with a slot extending from the end of the wall segment nearest the open end of the container body toward the opposite end of the wall segment, and having a bottom surface defined in part by a portion of the closer wall segment. The closer wall segment is provided with an oppositely directed slot arranged to in part overlap a portion of the first slot. The overlap of the two slots form an aperture dimensioned to accept the bail end. In this embodiment, the supporting structure holding the pair of wall segments apart from the sidewall is concave opening away from the open end of the container.

1 Claim, 8 Drawing Figures

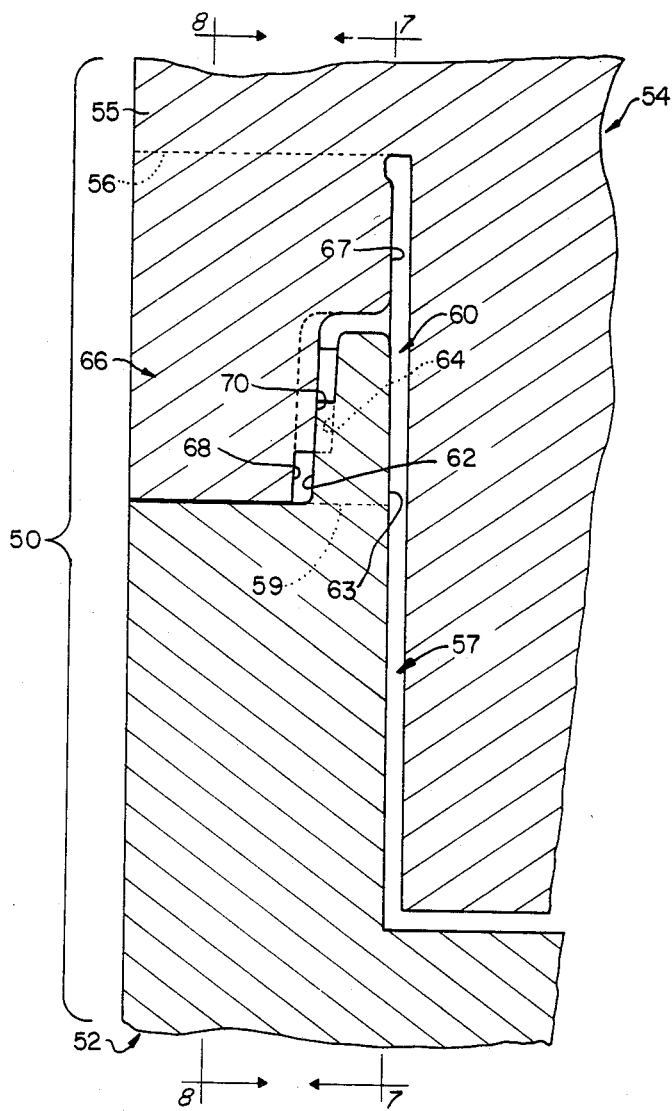
FIG. 6
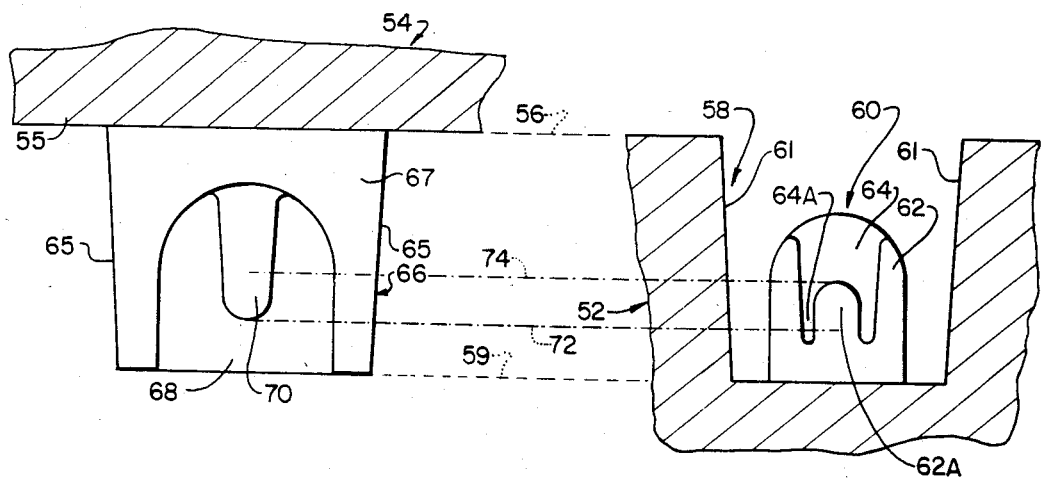
FIG. 7
FIG. 8

MOLD FOR FORMING A CONTAINER HAVING A PIVOT MEANS

This is a division of application Ser. No. 350,145, filed Feb. 19, 1982 now abandoned.

BACKGROUND OF THE INVENTION

This invention relates in general to a pivot assembly for the attachment of a bail to an article and to tooling for its manufacture, and more particularly to a pivot assembly and a mold therefor enabling simpler and more economical fabrication of the pivot assembly.

Pails, such as for example are used in the paint industry and the like, are usually provided with a bail pivotally secured to the pail by a pair of posts or ears attached to opposite sides of the pail. Typically, the posts are in the form of short, hollow cylinders, secured with their axes radial to the axis of the pail, each post having a small central opening distal from the pail wall. The bail is typically fabricated from a section of stiff wire, bent into arcuate form, with each end bent further to provide a hook-like termination which may be captivated in the opening in a post.

A common prior art method of assembly of such pails attaches to the walls of the pail body, as by welding, separately fabricated posts. Such an approach suffers from the need to separately fabricate the posts and pail body and subsequently attach one to the other. Clearly, manufacturing a number of diverse items and subsequently assembling them complicates the manufacturing operation, and is likely to have a significant impact on the cost of the end item.

An alternative method of manufacture known in the prior art is to fabricate both pail body and bail-holding posts as a unitary item, as for instance by molding. However, as the posts are shaped with a reentrant portion normal to the axis of the pail body, this method of manufacture generally requires multi-cored dies, the various parts of which must be withdrawn from the molded item in a fixed sequence. It will be understood that such a complex mold may unfavorably impact the cost of tooling.

Accordingly, it is an object of the present invention to provide a container with a pivot-post structure which may be molded as a unit with the container to which it is attached and which, while providing a reentrant aperture suitable for captivating the end of a wire bail, may be fabricated by a two-part mold which may be simply assembled and dissassembled.

Another object is to provide a mold for making a container with a pivot post structure embodying the present invention.

BRIEF DESCRIPTION OF THE INVENTION

These and other objects are met in the present invention of a container with unitary bail support posts and the mold for its fabrication in which each support post incorporates a pair of partially overlapping wall segments differently distant from the sidewall of the container body, the more distant segment being further from the sidewall than the nearer by the thickness of the nearer. In the preferred embodiment, the more distant wall segment is provided with a slot extending from the end of the wall segment nearest the open end of the container body toward the opposite end of the wall segment, and having a bottom surface defined in part by a portion of the closer wall segment. The closer wall segment is provided with an oppositely directed slot arranged to in part overlap a portion of the first slot. The overlap of the two slots form an aperture dimensioned to accept the bail end. In this embodiment, the supporting structure holding the pair of wall segments apart from the sidewall is concave, opening away from the open end of the container, permitting access to the interior of the support post by an extension of the mold's cavity, while the exterior surfaces of the post are formed by an extension of the core of the mold. In this way, a two-part mold may be used to form both the interior and exterior of the container body and the affixed external bail-holding posts.

Other objects of the invention will in part be obvious and will in part appear hereinafter. The invention accordingly comprises the apparatus possessing the construction, combination of elements, and arrangement of parts which are exemplified in the following detailed disclosure and the scope of the application of which will be indicated in the claims.

BRIEF DESCRIPTION OF THE DRAWINGS

For a fuller understanding of the nature and objects of the present invention, reference should be had to the following detailed description taken in connection with the following drawings wherein:

FIG. 6 is a fragmentary cross-sectional view taken along the same section line as FIG. 5 of a mold for making the pail of FIG. 1;

FIG. 7 is a fragmentary elevational view, from the inside, of a portion of the core of the mold of FIG. 6 taken along the line 7—7 of FIG. 6; and FIG. 8 is a fragmentary elevational view of a portion of the mold cavity of FIG. 6, taken along the line 8—8.

In the various views, like index numbers refer to like elements.

With respect to terminology, it will be noted in the description of the apparatus of this invention that portions of the apparatus are referred to as "upper" and "lower" portions, and that directions are referred to as "above" and "below". This is done only for convenience and to relate the description to the diagramatic representations in FIGS. 1, 2, and 5 through 8. It will be appreciated that the apparatus can function in any position or orientation and it is within the scope of this invention to have it do so.

DETAILED DESCRIPTION OF THE PREFERRED EMBODIMENT

Figure 1:
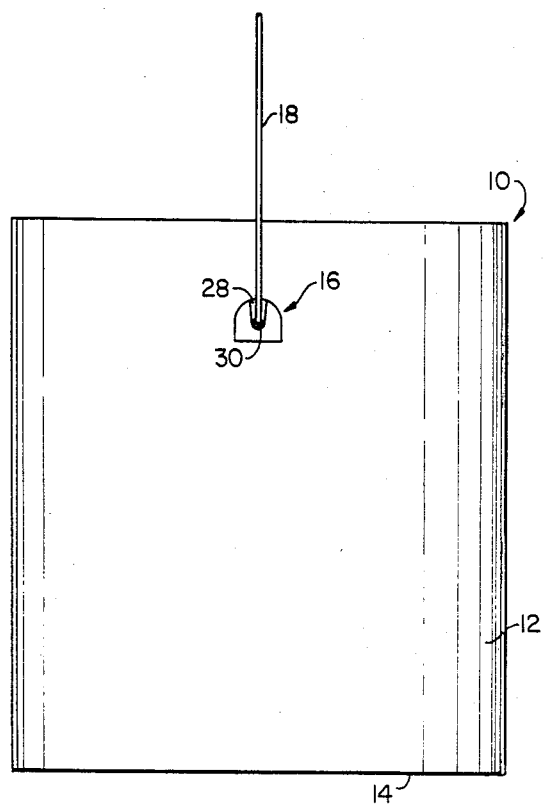
FIG. 1 is an elevational view of a pail incorporating a bail-holding post molded in accordance with the present invention.
Figure 2:
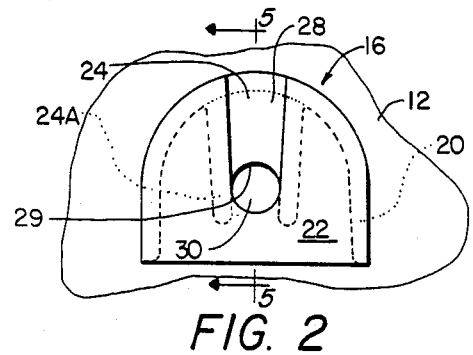
FIG. 2 is an enlarged elevational view of a portion of the pail of FIG. 1 showing the bail-holding post in greater detail.
Figure 3:
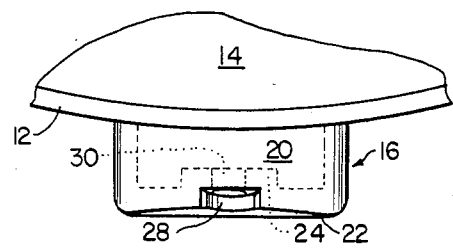
FIG. 3 is an enlarged plan view, from above, of the bail-holding post of FIG. 2.
Figure 4:
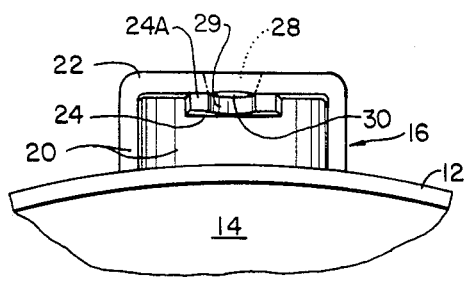
FIG. 4 is an enlarged plan view, from below, of the bail-holding post of FIG. 2.
Figure 5:
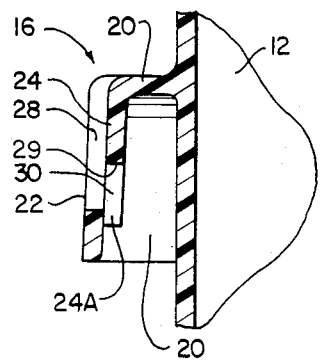
FIG. 5 is a cross-sectional view of the bail-holding post taken along the line 5—5 of FIG. 2.

Referring to FIG. 1, there may be seen a pail 10 made in accordance with the present invention. In a preferred embodiment, pail 10 comprises a tubular, thin-walled, right circular cylindrical side wall 12 surmounting a circular thin bottom wall 14, thereby forming an open-topped hollow cylindrical container. (While reference herein will be made to an open-topped pail, it will be understood that the pail of the present invention could, if desired, be provided with a closure.) Pail 10 is molded, as will be described in detail hereinafter, preferably from any of a number of polymers as, for instance, polycarbonate, polyethylene, polypropylene, or the like. Integrally formed with and projecting from side walls 12 of pail 10 are a pair of diametrically opposed pivotal bail support posts 16, only one of which is illustrated. Pivotal bail support posts 16 serve to secure a bail 18, typically fabricated from a length of stiff metallic wire, to opposite sides of the pail.

Each pivotal support post 16 is preferably an inverted U-shaped pocket, the open end of the pocket being directed toward the lower end of pail 10 (i.e., the end of the pail terminating in bottom wall 14). In greater detail, as may best be seen in FIGS. 2 through 5, each support post 16 comprises a supporting structure 20 and outer and inner wall segments 22 and 24 respectively. Supporting structure 20 is in the form of a thin arcuate wall, concave downward, integral with and projecting from side wall 12. Supporting structure 20 is also integral with wall segments 22 and 24, and serves to support them in spaced relationship from sidewall 12. Wall segments 22 and 24 partially overlap one another, and both are preferably slightly inclined to sidewall 12 so as to approach the sidewall toward the upper (open) end of pail 10.

Outer wall segment 22 is disposed further from side wall 12 than inner wall segment 24 by the thickness of the inner wall segment. In the preferred embodiment, outer wall segment 22 is framed by supporting structure 20, and completely covers the arch formed by the supporting structure except for a substantially centered groove 28 overlying in part and having as a bottom surface a portion of inner wall segment 24. Groove 28 extends from the upper portion of outer wall segment 22 to a central region thereof, and extends substantially parallel to the axis of pail 10. Groove 28 terminates in its lower end in a semicircular profile.

Inner wall segment 24 depends from the upermost portion of support structure 20 and underlies, in part, groove 28, extending on either side thereof beneath outer wall segment 22. Preferably, inner wall segment 24 has a width exceeding the width of groove 28 on the order of twice the thickness of either wall segment. Inner wall segment 24 extends from the upper portion of support structure 20 toward the lower end of the structure a distance slightly in excess of the length of groove 28. The lower end of inner wall segment is centrally relieved by a semicircular notch 29. Notch 29 forms a pair of opposed side sections 24A in inner wall segment 24, by which the inner wall segment is connected to outer wall segment 22 astride the lowermost end of groove 28.

The lower semicircular portion of groove 28 in outer wall segment 22 and the upper semicircular portion of notch 29 in inner wall segment 24 are disposed with respect to each other to form a circular aperture 30 disposed between the reinforcing opposed side sections 24A. Aperture 30 is dimensioned to receive an end of bail 18, and the separation between inner wall segment 24 and sidewall 12 and between aperture 30 and supporting structure 20 are chosen sufficiently large to accept a hook-ended bail end (i.e., the diameter of aperture 30 and the distance between inner wall segment 24 and sidewall 12 are chosen to be somewhat greater than the cross-sectional diameter of the wire from which bail 18 is fabricated, while the distance between aperture 30 and supporting structure 20 is preferably at least twice this diameter).

Turning to FIG. 6, there may be seen in fragmentary cross-section a mold 50 suitable for forming pail 10 of FIG. 1. Mold 50 comprises an outer mold portion or cavity, generally indicated by index number 52, and an inner mold portion or core, generally indicated by index number 54. As is known in the art, cavity 52 is configured and dimensioned to generally define the outer surface of pail 10, while core 54 is configured and dimensioned to generally define the inner surface, with the core being capable of being withdrawn, through the open end of the pail, after the latter is formed, and the pail thereafter being capable of being withdrawn from the cavity. To this end cavity 52 and core 54 are provided with relatively smooth surfaces and, except as hereinafter noted, cavity 52 is a generally concave form of slightly larger inside dimensions than the outside dimensions of the generally convex core 54. For the molding of the preferred embodiment of pail 10, the principle molding surfaces of cavity 52 and core 54 are of right circular cylindrical form, dimensioned respectively to match (with allowance for dimensional changes of the material of construction of the pail) the inside and outside of the pail. The uppermost end of cavity 52 terminates level with the plane of the lip (i.e., the upper end of sidewall 12) of the pail to be molded thereby. Core 54 is provided with a radial flange 55 extending outward over the lip of the pail to be molded. Flange 55 is generally configured to engage cavity 52 along parting line 56, thereby supporting the convex portion of core 54 in confronting spaced-apart relationship to the concave portion of cavity 52, forming a void, generally indicated by index number 57, in the shape of the pail between core and cavity.

In order to permit the molding of pail 10 and affixed bail support posts 16 with a two-piece mold, cavity 52 and core 54 have been importantly modified. For each pivotal support post 16 to be molded, cavity 52 has been modified to include a keyway 58 (best seen in FIG. 8) extending into the cavity from its upper end (coincident with parting line 56), while core 54 is similarly provided with a mating key 66 depending from flange 55 (FIG. 7). It will be understood that a pair of such keyways 58 diametrically opposite one another are provided in cavity 52 (and a similar pair of such keys 66 on core 54), although only one keyway and one key are depicted in the figures.

Each keyway 58 is dimensioned to extend from parting line 56 toward the lower end of cavity 52 by a distance equal to the distance between the lower edge of bail support post 16 and the rim of the pail, the lowermost portion of the keyway defining a lower parting line 59. Preferably, keyway 58 is of trapazoidal form, its sides 61 tapering together from the upper limit (parting line 56) of cavity 52 toward the lower end (parting line 59) of the keyway. In the preferred embodiment, each keyway 58 extends throughout the outer wall of the cavity. A post 60 is disposed centrally within, and extending from the lower end of, each keyway 58. Interior surface 63 of post 60 is configured and dimensioned to match the corresponding portion of the inner surface of cavity 52. Post 60 is otherwise dimensioned to define the interior of a pivotal support post 16. For the preferred embodiment of support post 16 described hereinbefore, each post 60 is of arch-like shape, having a height and width similar to the inside dimensions of support structure 20. Outside surface 62 is spaced apart from inside surface 63 by a distance equal to the separation between outer wall segment 22 of support post 16 and adjacent sidewall 12. A W-shaped slot 64 is provided in the central upper half of outside surface 62 of each post 60, a pair of narrow extensions 64A of the slot delimiting a centrally disposed tongue 62A of the outside surface. Slot 64 is configured and dimensioned to correspond to an inner wall segment 24, extensions 64A corresponding opposed side sections 24A, with the thickness of the relief of the slot corresponding to the thickness of a wall segment. Tongue 62A correspondingly conforms to the shape and dimensions of notch 29 in the inner wall segment.

Turning to FIG. 7, there may be seen a view, as would be seen from the inside, of an outer fragment of core 54. Key 66, configured and dimensioned to fit within keyway 58, depends from the outer portion of core 54 below the normal parting line 56. Key 66 is of trapazoidal form, its sides 65 tapering top to bottom to match the taper of sides 61 of keyway 58. As may be seen by comparing FIGS. 6 and 5, key 66 is spaced apart from the inner portion of core 54 by a distance equal to the thickness of sidewall 12, the inner surface 67 of the key being configured and dimensioned to match the corresponding surface of cavity 52 adjacent keyway 58. Referring once more to FIG. 7, it may be noted that a recess 68 is centrally provided in inner face 67 of key 66. Recess 68 is configured and dimensioned to conform to the outer dimensions of a pivotal support post 16, the height and width of the recess corresponding to the outside height and width of support structure 20, and the depth of the recess corresponding to the distance from the outside surface of an outer wall segment 22 to the adjacent sidewall 12. A U-shaped pad 70, configured and dimensioned to correspond to groove 28, is centrally positioned in the uppermost portion of recess 68. Pad 70 has a height and width corresponding to the height and width of groove 28, and a thickness corresponding to the thickness of outer wall segment 22.

Preferably, pad 70 of key 66 and tongue 62A of post 60 are of the same width, each further being provided with a semicircular termination centered approximately centrally upon the respective recess 68 and post 60. The lowermost portion of pad 70 (delimited by reference line 72 in FIGS. 7 and 8) is made to be less distant from the lowermost portion of key 66 (corresponding to lower parting line 59) than the uppermost portion of tongue 62A (delimited by reference line 74) is from the lowermost portion of keyway 58 by a distance substantially equal to the width of the pad or the tongue.

In addition to the structure herein described in detail, it will be understood that, depending upon the molding process being used, mold 50 may be provided with sprues, risers, guide and ejector pins, and the like (not shown), all as are well known in the art. Thus, for example, one of the mold parts 52 and 54 is provided with one or more openings (not shown) through which a suitable plastic molding composition is injected into molding chamber 57.

In operation, core 54 is inserted centrally into cavity 52 with each key 66 of the core located in a keyway 58 of the cavity. Sides 65 of keys 66 come in contact with confronting sides 61 of keyways 58 as the keys bottom out on the keyway at the level of lower parting line 59 and as flange 55 of core 54 and the rim of cavity 52 contact at upper parting line 56. In this position, the inner surface of the lowermost portion of pad 70 kisses, i.e., is in opposing sliding contact with, the outer surface of the uppermost portion of tongue 62A, the contact area being substantially circular, as may be seen by reference to FIG. 6 in consideration of FIGS. 7 and 8, the upper and lower limits of contact area being delimited in the latter two views by reference lines 74 and 72 respectively. Aside from this contact area and that between flange 55 and cavity 52 at parting line 56 and between keys 66 and keyways 58 at lower parting line 59 and on sides 65 and 61, the core and the cavity are spaced apart, forming void 57 in the shape of pail 10 and posts 16. In the interstice between slot 64 in post 60 (at extensions 64A) and recess 68 in key 66, the thickness of void 57 is a maximum, corresponding to the overlap of inner and outer wall segments 24A and 22, respectively. Elsewhere between post 60 and key 66, the separation is preferably similar to the nominal thickness of sidewall 12.

Posts 60 are, in effect, cores for the molding of the interior of bail support posts 16, while recesses 68 in keys 66 serve as mold cavities for forming the exterior surfaces of the support posts. Contact between the uppermost and lowermost portions respectively of tongue 62A and pad 70 prevents introduction of the material between the tongue and pad, thereby forming aperture 30 in each support post. Pads 70 of recesses 68 project downward from the upper portion of the recesses, while tongues 62A of posts 60 project upwards from the level of lower parting line 59.

The material of construction of a pail may be introduced into void 57, either before mold 50 is completely assembled or afterwards, by any of the methods known in the art. As all parts of void 57 are in open communication with one another, the material may be easily introduced into all of the parts of the mold defining the structure of pail 10 and support posts 16.

After a pail and the attached support posts are formed, core 54 may be withdrawn from the pail, the convex portion of the core passing through the open end of the pail and the concave portion (recesses 68 in keys 66) directly lifting off of the support posts. Finally, the formed pail may be lifted out of the concave cavity 52, bail support posts 16 being free to lift off of the convex portion (posts 60) of the cavity. The removal of core 54 from the formed pail is facilitated by the taper of sides 61 and 65 in keyway and key, the sliding fit between pads 70 of keys 66, the interior of grooves 28 of bail support posts 16, and tongues 62A, and the taper in recesses 68 (and in bail support posts 16). The removal of a pail from cavity 52 is facilitated by the upward projection of tongues 62A into notches 29 of support posts 16, the downward projection of side sections 24A of the support posts into slots 64 of posts 60, and the taper and arcuate shape of posts 60 and bail support posts 16.

Various modifications may be made to the structure of the pivotal support posts and the mold herein described in detail without departing from the scope of the present invention. Thus, it will be recognized that bail support posts 16 of pail 10 need not be formed with a downward-facing concavity as described, but might instead be formed with an upwardfacing concavity, in which case the keys on the core of the mold would incorporate the mold portion defining the interior of the support posts while the keyway in the cavity of the mold would incorporate the exterior mold for the support posts. Then, too, support structure 20 of the support posts 16 need not be an arcuate wall but might be polygonal. Nor need the support structure be a single wall, it being possible to substitute, for instance, a pair of walls normal to sidewall 12 and radiating from the axis of pail 10. It will also be recognized that aperture 30 need not be circular, and consequently the contacting portions of pad 70 and tongue 62A need not meet over a circular area. Similarly, groove 28 need not be elongate, but could instead be confined to the half of aperture 30 defined by outer wall segment 22. Then, too, it will be recognized that inner and outer wall segments 24 and 22 need not be configured and disposed so that side sections 24A provide a reinforcement about groove 28 and aperture 30.

Yet again, while the preferred general shape of pail and mold surfaces is right circularly cylindrical, other cylindrical or prismatic forms may be realized. Indeed, the only portion of the exterior surface of the sidewall that need be of cylindrical or prismatic form (in order to allow release of the keys depending from the flange of the core) is that between the open end of the container and the support posts; the remainder of the container sidewall (and the corresponding mold) being possibly tapered, hemispherical, or of other shape.

Since these and other changes may be made in the above apparatus without departing from the scope of the invention herein involved, it is intended that all matter contained in the above description or shown in the accompoanying drawings shall be interpreted in an illustrative and not a limiting sense.

What is claimed is:

1. Apparatus for molding a container having unitary bail supporting means, said apparatus comprising an open-ended mold cavity having an inner surface defining an exterior portion of said container and a mating mold core having an exterior surface defining an interior portion of said container, wherein:

said cavity is provided with a plurality of interior keyways adjacent the open end of said mold cavity, each of said keyways being provided with a centrally disposed post having a surface contiguous with said inner surface of said cavity and a spaced apart surface bearing a centrally disposed elongate tongue extending partially along said post; and said core is provided with an exterior flange depending from which are a like plurality of exterior keys disposed and dimensioned to mate with said keyways, said keys being spaced apart from and confronting said inner surface, each of said keys incorporating a recess dimensioned and disposed to accommodate in confronting spaced-apart relationship a one of said posts, and each of said recesses being provided with a centrally disposed elongate pad extending partially along said recess and being dimensioned and disposed so as to in part contact said tongue along a surface substantially concentric with said inner surface.

* * * * *